Feb. 1, 1944.   G. W. GROVES   2,340,588
FISHING DEVICE
Filed Aug. 7, 1942
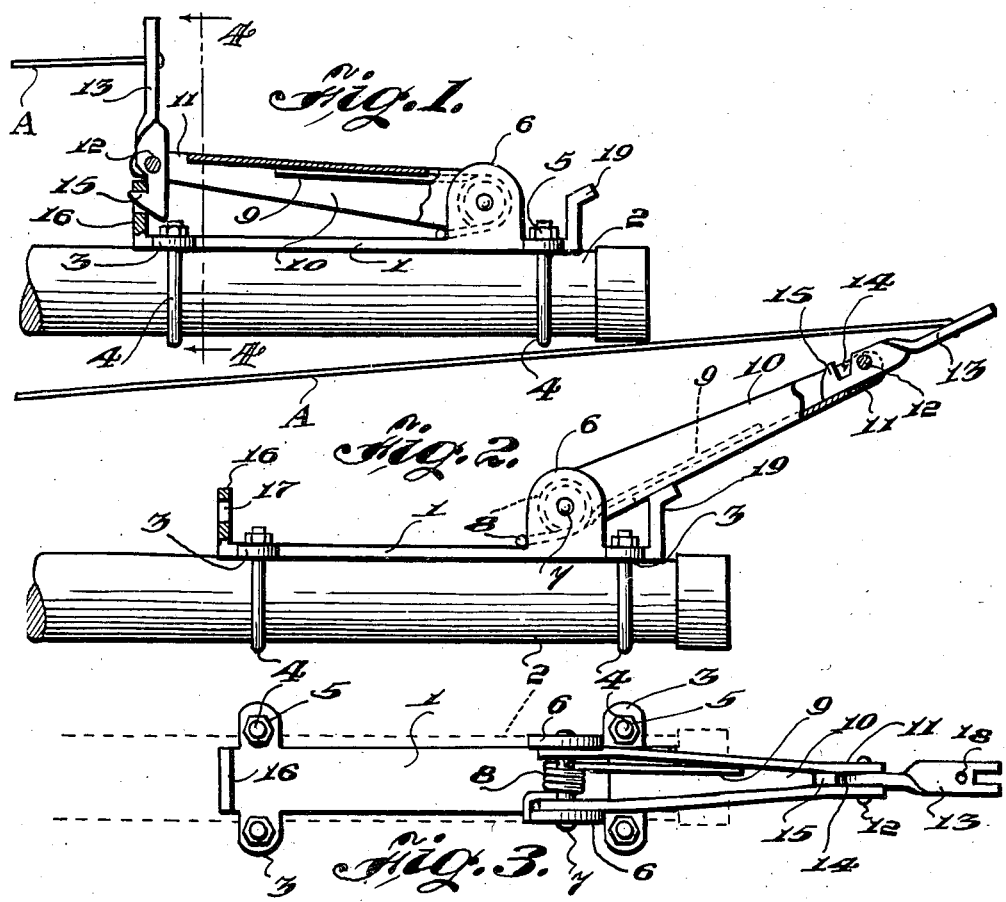
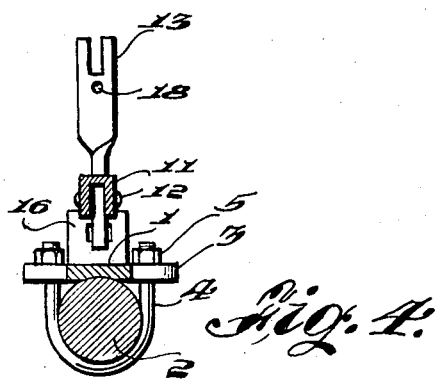
George W. Groves,
INVENTOR.
BY John M. Spellman
Attorney.

Patented Feb. 1, 1944

2,340,588

UNITED STATES PATENT OFFICE 2,340,588

FISHING DEVICE

George W. Groves, Dallas, Tex.

Application August 7, 1942, Serial No. 453,917

3 Claims. (Cl. 43—15)

This invention relates to fishing devices in which a rod and line with hook are employed to catch the fish, and in such connection it relates more particularly to a device of this nature which is automatic in operation.

The primary object of the invention is the provision of an automatic fishing device which is simple in construction, economical of manufacture, and easy and positive in operation.

The invention will be readily understood from a perusal of the following detailed description, taken in connection with the accompanying drawing, and in the drawing:

Figure 1 is a side elevational view of one form of the fishing device, the view being partly in section and partly broken away; the device shown in set position;

Figure 2 is view similar to Figure 1, but illustrating the fishing device in fish-catching, jerking or released position;

Figure 3 is a top plan view of Figure 2; the rod being indicated in broken lines;

Figure 4 is a cross-sectional view of Figure 1, the view being had on the line 4—4 of said figure.

In carrying out the invention, a base plate 1 is provided for securing the device to a fishing rod or pole 2. For this reason the plate is formed with the ears 3, the ears being bored for the insertion of the U-bolts 4 and by the use of the nuts 5 the device is firmly attached to the rod 2.

The plate 1 also includes spaced lugs 6, with a pin 7, for seating a spring 8, the spring being adapted to have one end 9 bear against an arm 10. This arm 10 has its forward end formed into a fork 11, and a pin 12 provides a means for pivotally supporting in the fork a trigger 13. The trigger 13 has a notch 14, and the tripping mechanism is completed by the extension of the forward end of the plate 1 into a lug 16. An opening 17 in the lug 16 provides a means for engagement of the trigger and lug. A fishing line A being secured in a hole 18 formed in the trigger 13 completes the set up. From the foregoing it will be apparent that when a fish strikes and pulls the line A, the tooth 15 will move out of the opening 17 and the spring 8 will exert a tension on the arm 10 and jerk the line to the position shown in Figure 2. At the end of the stroke or jerking movement the arm 10 strikes the stop finger 19, which is the limit of the stroke of the arm 10.

While the disclosure presents a new and novel automatic fishing device, it will be understood that the invention is capable of being altered and changed to some extent, within keeping of the inventive thought, and within the scope and meaning of the following claims.

What is claimed is:

1. An attachment for a fishing rod for facilitating quick movement of a line when the end of a hook thereon is engaged by a fish, said attachment comprising an integral member having a longitudinally extending portion adapted to be secured in contact with a fishing rod and having an upwardly extending portion at each end thereof and a pair of spaced upwardly extending lateral portions on the opposite sides thereof, one of the upwardly extending end portions constituting a stop and being positioned centrally of the pair of upwardly extending lateral portions, the other upwardly extending end portion having an opening therethrough and constituting a latch holding means, an arm, a pivot member on which the arm is pivoted on the pair of upwardly extending lateral portions, a latch on said arm engageable with the opening, a spring surrounding the pivot member, and a line attached to the latch, the arm having a central plate-like portion, the upper surface of which is adapted to contact the stop and the under surface of which is adapted to be engaged by a portion of said spring whereby upon release of the latch by a pull on the line the arm will swing so that the upper surface of the central portion will contact the stop.

2. An attachment for a fishing rod for causing an intensified initial jerking movement of a line when a hook on the end thereof is engaged by a fish, or the like, comprising a longitudinal base member adapted to be secured in contact with the rod and having outwardly projecting end portions, one of said end portions comprising a stop member and the other end portion having an opening therethrough, a pair of spaced ears extending upwardly from the sides of the base member adjacent said stop member, a lever, a pivot member on which said lever is pivotally mounted at one end between said ears, a latch member pivotally connected to the other end of said lever and engageable with the opening in said other end portion, a line attached to the latch member, and a spring having one end coiled about the pivot member and having a longitudinal portion adapted to engage the under side of said lever, and tending to swing the said lever about its pivot into engagement with said stop when the latch is released by a pull on the line.

3. A fishing rod attachment for causing an intensified jerking movement of a line when a hook on the end thereof is engaged by a fish or the like, said attachment comprising a longitudinal base member adapted to be seecured in contact with the rod and having outwardly projecting end lugs, the front lug having an opening therein for receiving a latch, and the rear lug comprising a stop member, a pair of spaced ears projecting upwardly from opposite sides of the base member adjacent said stop member, a pivot member between said ears, a lever pivotally mounted at one end on said pivot member, a latch member pivotally connected to the opposite end of the lever and adapted to engage the opening in the front lug for retaining the lever in latched position, a line secured to the latch member and adapted to release the latch member when a pull is exerted thereon, and means for swinging the lever from the latched position into engagement with said stop member when the latch member is released, said means comprising a spring having an end portion coiled about the pivot member and having a longitudinal portion engaging the under side of said lever and urging it toward said stop member.

GEORGE W. GROVES.